(12) United States Patent
Frey et al.

(10) Patent No.: US 12,241,551 B2
(45) Date of Patent: Mar. 4, 2025

(54) LUBRICATION FOR HYDRAULIC MACHINE SEAL

(71) Applicant: Poclain Hydraulics Industrie, Verberie (FR)

(72) Inventors: Adam Frey, Verberie (FR); Patrick Jalabert, Verberie (FR); Laurent Naceur, Verberie (FR)

(73) Assignee: Poclain Hydraulics Industrie (FR)

( * ) Notice: Subject to any disclaimer, the term of this patent is extended or adjusted under 35 U.S.C. 154(b) by 0 days.

(21) Appl. No.: 17/926,925

(22) PCT Filed: May 24, 2021

(86) PCT No.: PCT/FR2021/050942
§ 371 (c)(1),
(2) Date: Nov. 21, 2022

(87) PCT Pub. No.: WO2021/240105
PCT Pub. Date: Dec. 2, 2021

(65) Prior Publication Data
US 2023/0204106 A1 Jun. 29, 2023

(30) Foreign Application Priority Data
May 25, 2020 (FR) ..................... 2005493

(51) Int. Cl.
*F16J 15/16* (2006.01)
*F16J 15/3204* (2016.01)

(52) U.S. Cl.
CPC ......... *F16J 15/162* (2013.01); *F16J 15/3204* (2013.01); *F16N 2210/14* (2013.01)

(58) Field of Classification Search
CPC .... F16J 15/00; F16J 15/16; F16J 15/50; F16J 15/52; F16J 15/162; F16J 15/324;
(Continued)

(56) References Cited

U.S. PATENT DOCUMENTS

| | | | | | |
|---|---|---|---|---|---|
| 4,196,910 A | * | 4/1980 | Aizu | ...................... | F16J 15/004 415/111 |
| 4,268,229 A | * | 5/1981 | Berg | ...................... | F16J 15/004 415/230 |

(Continued)

FOREIGN PATENT DOCUMENTS

| | | | | |
|---|---|---|---|---|
| CN | 107849972 A | * | 3/2018 | .............. F02B 39/00 |
| EP | 0884478 A1 | * | 12/1998 | |

(Continued)

OTHER PUBLICATIONS

International Preliminary Report on Patentability and Written Opinion of International Application No. PCT/FR2021/050942 dated Nov. 17, 2022 (and English Translation), 16 pages.

(Continued)

*Primary Examiner* — Nathan Cumar
(74) *Attorney, Agent, or Firm* — Lippes Mathias LLP

(57) ABSTRACT

A hydraulic machine has a first assembly and a second assembly movable in rotation relative to each other about an axis of rotation. The first assembly and the second assembly define an internal volume and are in contact along an interface. The interface between the first assembly and the second assembly is provided with a sealing element positioned in a housing connected to the internal volume via a first duct, and to the surrounding environment via a second duct. The first duct is provided with a sealing element adapted to isolate the housing from the internal volume, where a secondary cavity is formed in the first assembly or in the second assembly. The secondary cavity is connected to the housing and isolated from the internal volume.

7 Claims, 2 Drawing Sheets

(58) Field of Classification Search
CPC ...... F16J 15/3404; F16J 15/40; F16J 15/3204; F16J 15/3208; F16J 15/3212; F16J 15/3216; F16J 15/322; F16J 15/3232; F16J 15/3236; F16N 2210/00; F16N 2210/14
USPC .......................................................... 277/345
See application file for complete search history.

(56) References Cited

U.S. PATENT DOCUMENTS

| | | | | |
|---|---|---|---|---|
| 2003/0221911 | A1* | 12/2003 | Eriksen | F16C 41/008 184/6.4 |
| 2016/0146348 | A1* | 5/2016 | Van Opstal | F16J 15/344 277/307 |
| 2018/0347704 | A1* | 12/2018 | Rippel | F16J 15/004 |
| 2020/0116261 | A1* | 4/2020 | Haas | F16J 15/3404 |

FOREIGN PATENT DOCUMENTS

| | | |
|---|---|---|
| EP | 1 947 373 A1 | 7/2008 |
| EP | 3 106 325 A1 | 12/2016 |
| EP | 3 022 470 A1 | 8/2020 |
| EP | 3 022 470 B1 | 8/2020 |
| FR | 3 075 252 A1 | 6/2019 |
| FR | 3 080 576 B1 | 5/2022 |

OTHER PUBLICATIONS

International Search Report of International Application Serial No. PCT/FR2021/050942 dated Sep. 8, 2021, (w/English Translation) 6 pages.

* cited by examiner

LUBRICATION FOR HYDRAULIC MACHINE SEAL

BACKGROUND OF THE DISCLOSURE

The present disclosure relates to an improved sealing device for a hydraulic machine, and in particular to a sealing device for which an improved lubrication system is proposed.

STATE OF THE ART

The use of hydraulic machines in different environments raises issues in terms of sealing. Indeed, a recurring issue is to prevent the intake of impurities into an internal volume of the crankcase of the hydraulic machine.

Different sealing structures have been proposed in order to ensure good sealing between the internal volume of the hydraulic machine and the external environment. However, the known solutions remain problematic in terms of reliability, in particular over time.

A first mounting consists in placing a single axial sealing element ensuring isolation between the surrounding environment and the internal volume of the crankcase. However, in the event of a pressure rise in the crankcase, the sealing element may be expelled from its housing, or destroyed, for example by tearing or by seizing of the surfaces in sliding contact in the case of metal sealing because the bearing force between two sliding portions increases. This results in high friction and loss of efficiency in the case of metal seals. Such pressure rises in the crankcase are due, for example, to the start-up of a cold hydraulic machine. Pressurized oil reaches the crankcase of the machine, through the usual internal leakages in these machines, while the crankcase oil cannot easily escape through the crankcase drain pipe which is still full of oil cold and therefore generating very high pressure drops due to the high viscosity of the cold oil. Such operations quickly destroy the sealing element. Particularly, if the pressure rises in the crankcase of the machine, the bearing force between sliding portions of the sealing element increases, and seizing may follow, which destroys the sealing element. The components of the sealing element can also be destroyed by the pressure.

Alternatively, the axial sealing elements ensuring the isolation between the interior and the exterior of the hydraulic machine can be disposed in dedicated housings, these housings being themselves isolated from the internal volume of the crankcase comprising the hydraulic machine, for example a hydraulic machine, by a crankcase sealing commonly qualified as absolute sealing, associating a dynamic sealing element such as a lip ring with a dynamic sealing element resistant to possible peak pressures, for example an O-ring coupled to an annular element. However, such a mounting thus defines a closed chamber between the axial sealing elements and the crankcase sealing elements. However, such a closed chamber raises an issue in terms of lubrication. Indeed, the housing comprising the axial sealing elements being totally isolated from the internal volume of the crankcase by the crankcase sealing, this housing is not continuously lubricated. However, a lack of lubrication can lead to rapid destruction of the axial sealing elements, in particular under the effect of seizing due to a lack of oil or heating that can lead to a pressure rise in the housing, causing an expulsion of the present oil, which accentuates the issue. The solutions commonly proposed consist of inserting a predetermined oil volume into this housing, this oil volume necessarily having to be replaced at regular intervals. It is however understood that such solutions are highly restrictive and require dedicated maintenance operations. Furthermore, these solutions raise a space requirement issue, for the storage of a sufficient volume of oil in the housing, generating an axial space requirement which is not compatible with structures of hydraulic machines that meet strict constraints in terms of space requirement.

The present disclosure thus aims to at least partially address these issues.

SUMMARY OF THE DISCLOSURE

To this end, the present disclosure proposes a hydraulic machine comprising a first assembly and a second assembly movable in rotation relative to each other about an axis of rotation, the first assembly and the second assembly defining an internal volume and being in contact along an interface, the interface between the first assembly and the second assembly being provided with a sealing element positioned in a housing connected to the internal volume via a first duct on the one hand, and to the surrounding environment via a second duct on the other hand, the first duct being provided with a sealing element adapted to isolate the housing from the internal volume, characterized in that said sealing element is an axial sealing element, comprising a first metal annulus and a second metal annulus, a first elastomeric annulus and a second elastomeric annulus, in which the first metal annulus and the second metal annulus are bearing against each other along the axial direction defined by the axis of rotation, the first elastomeric annulus is mounted bearing against the first metal annulus on the one hand, and against a partition wall of the first assembly on the other hand, the second elastomeric annulus is mounted bearing against the second metal annulus on the one hand, and against a partition wall of the second assembly on the other hand, in that a secondary cavity is formed in the first assembly or in the second assembly, said secondary cavity being connected to the housing, and isolated from the internal volume, typically by means of bores or ducts.

According to one example, the secondary cavity is formed in a portion of the crankcase of the hydraulic machine.

The hydraulic machine comprises for example at least one bearing positioned in the housing, bearing against a first shoulder formed in the first assembly on the one hand and a second shoulder formed in the second assembly on the other hand, the secondary cavity opening out into the housing around said bearing relative to the axis of rotation.

According to one example, the secondary cavity extends according to an angular sector of 360° about the axis of rotation.

According to one example, the secondary cavity is connected to the housing via a plurality of bores formed in the first assembly.

Said bores then typically extend along an angular sector less than or equal to 180° about the axis of rotation.

According to one example, the housing is then formed so as to extend at least partially around a rolling element interposed between the first assembly and the second assembly, relative to the axis of rotation.

As a variant, the secondary cavity is formed in a shaft of the hydraulic machine.

According to one example, the secondary cavity is connected to the housing (4) via a plurality of separate bores formed in the shaft.

According to one example, the secondary cavity is dimensioned such that the total volume of the housing and the secondary cavity is greater than or equal to 300 mL.

According to one example, the secondary cavity is connected to the surrounding environment via a secondary orifice, said secondary orifice being provided with a plug.

The hydraulic machine is for example a hydraulic machine comprising a cylinder block provided with a plurality of housings extending radially relative to the axis of rotation in which cylinders and a multi-lobe cam surrounding the cylinder block are disposed. Such a hydraulic machine can for example present an operation of the hydraulic motor or of the hydraulic pump.

BRIEF DESCRIPTION OF THE DRAWINGS

The invention and its advantages will be better understood upon reading the detailed description given below of different embodiments of the invention given by way of non-limiting examples.

In all the figures, the elements in common are identified by identical numerical references.

DETAILED DESCRIPTION OF THE PREFERRED EMBODIMENTS

One exemplary embodiment of the invention is now described with reference in particular to FIGS. 1 et 2.

Figure 1:
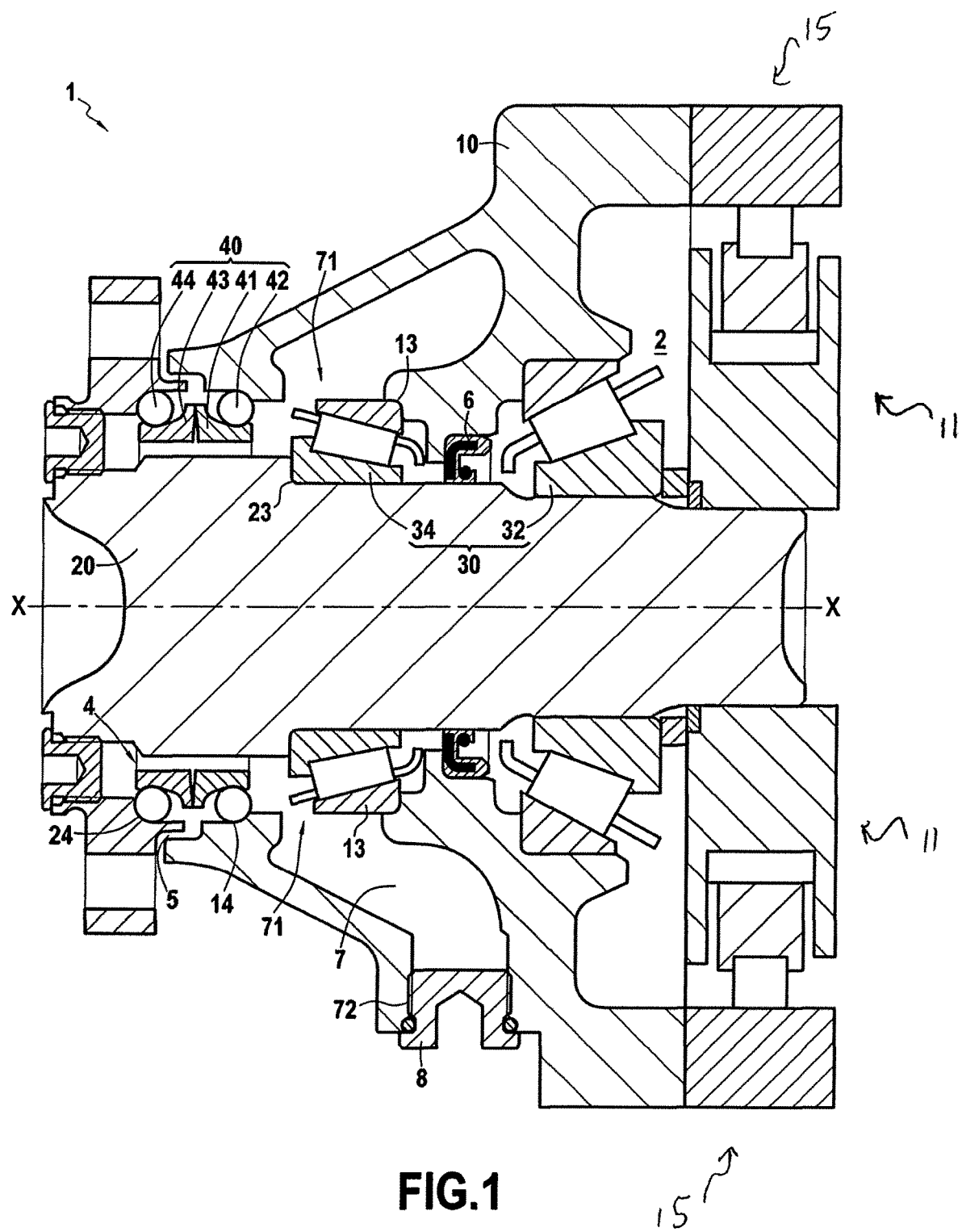
FIG. 1 shows a cross-sectional view of a hydraulic machine portion according to one aspect of the disclosure.

FIG. 1 represents a partial sectional view of a hydraulic machine 1. The hydraulic machine 1 comprises a first assembly 10 and a second assembly 20 movable in rotation relative to each other along an axis of rotation X-X. In the following description, the designations "radial" and "axial" are defined relative to the axis of rotation X-X unless otherwise stated.

In the example illustrated, the rotational guiding is ensured by rolling elements, here tapered bearings 32 and 34 forming a bearing 30. It is understood that this exemplary embodiment is not limiting, and that the rolling elements can be of any type. The hydraulic machine 1 comprises an internal volume 2 in which different components are disposed depending on its nature, for example a radial-piston or axial-piston hydraulic motor, a radial-piston or axial-piston hydraulic pump, a braking system, or any other apparatus presenting two assemblies in rotation relative to each other.

The first assembly 10 and the second assembly 20 designate the different components of the hydraulic machine 1. By way of example, one of these assemblies can comprise a shaft and a cylinder block 11 of a hydraulic machine, while the other of these assemblies can comprise a multi-lobe cam 15 and a distributor of a hydraulic machine. The first assembly 10 and second assembly 20 can comprise braking means, for example disks adapted to prevent the relative rotational movement of the first assembly 10 relative to the second assembly 20 under the effect of friction between said disks.

For such a hydraulic machine, a hydraulic power circuit is commonly defined, to which suction and delivery ducts, ducts of the distributor and the piston chambers of the cylinder block are connected. Said hydraulic power circuit typically comprises a hydraulic pump defining feed and return branches, or high-pressure HP and low-pressure LP branch, in a hydraulic circuit which can be in open loop or in closed loop. The hydraulic power circuit ensures the transmission of the hydraulic motive power.

An internal volume 2 is also defined for such a hydraulic machine, which corresponds to the volume contained in the crankcase around the different elements of the hydraulic machine 1. The internal volume 2 is isolated from the hydraulic power circuit by sealing, typically sealing of the pistons and of the distributor in a manner known to those skilled in the art. The internal volume 2 of the hydraulic machine receives an oil flow rate coming from the internal leakages of the hydraulic machine coming from the power circuit, and it is typically connected by a drain to a tank to discharge this oil flow rate, such that the pressure in the internal volume of the hydraulic machine remains substantially equal to the pressure of said tank, which is typically equal to or close to the atmospheric pressure.

The internal volume 2 of the hydraulic machine 1 is isolated from the external environment via a first sealing element 40 disposed in a housing 4. The housing 4 is connected to the external environment via a duct 5. In the example illustrated, the first sealing element 40 is an axial seal, or floating seal, commonly referred to as a duo-cone seal.

The first sealing element 40 here comprises a first metal annulus 41 and a second metal annulus 43, made of metal material, and which are typically symmetrical relative to a plane extending radially relative to the axis of rotation X-X. The first sealing element 40 also comprises a first elastomeric annulus 42 and a second elastomeric annulus 44, made of elastomeric material.

The first metal annulus 41 and the second metal annulus 43 bear against each other along the axial direction defined by the axis of rotation X-X.

The first elastomeric annulus 42 is mounted bearing against the first metal annulus 41 on the one hand, and against a partition wall 14 of the first assembly 10 on the other hand.

The second elastomeric annulus 44 is mounted bearing against the second metal annulus 43 on the one hand, and against a partition wall 24 of the second assembly on the other hand 20.

The first elastomeric annulus 42 and the second elastomeric annulus 44 are typically positioned radially on the outside relative to the first metal annulus 41 and to the second metal annulus 43. The first metal annulus 41 and the second metal annulus 43 compress the first elastomeric annulus 42 and the second elastomeric annulus 44 against the partition walls 14 and 24 respectively of the first assembly 10 and of the second assembly 20, and thus ensure a sealed connection.

The first metal annulus 41, the second metal annulus 43 as well as the partition walls 14 and 24 respectively of the first assembly 10 and of the second assembly 20 are typically formed such that the first elastomeric annulus 42 and the second elastomeric annulus 44 tend to move the first metal annulus 41 and the second metal annulus 43 against each other along the axial direction defined by the axis of rotation X-X.

As indicated above, an issue with this type of mounting relates to the lubrication of the first sealing element 40. Indeed, in conventional structures, the housing 4 is typically isolated from the internal volume 2 by a seal qualified as absolute, which commonly comprises a dynamic seal such as a lip ring, coupled to a reinforced sealing adapted in particular to withstand any peak pressures. However, such a mounting completely isolates the housing 4 from the internal volume 2, which therefore requires providing lubrication from the design, for example by inserting a predetermined amount of oil into the housing 4. However, this imposes regular maintenance operations in order to reintroduce oil into the housing 4, insofar as the oil gradually escapes towards the external environment. Furthermore, the hydraulic machines such as the hydraulic machines or apparatuses commonly have significant constraints in terms of axial space requirement, which does not allow having sufficient volume to ensure lubrication of the first sealing element 40 and avoiding possible pressure rises in the housing 4 due to the heating of the reduced amount of oil therein. However, such a sealing element 40 which comprises two metal elements in rotation relative to each other requires much higher lubrication than dynamic sealing elements such as lip rings, and therefore requires specific solutions. The usual solutions proposed for other dynamic seals indeed do not allow ensuring sufficient lubrication for such sealing elements.

In order to address these issues, the structure as proposed comprises a secondary cavity 7, formed in the first assembly 10 or in the second assembly 20, and connected to the housing 4 so as to provide an additional reserve volume, without having an impact on the axial space requirement of the hydraulic machine 1. The secondary cavity 7 is connected to the housing 4 via a plurality of ducts or passages, which can for example be integrally cast or machined, for example made by drilling.

The housing 4 is here isolated from the internal volume 2 by a second sealing element 6, for example a dynamic seal of the lip ring type. This second sealing element 6 thus delimits the separation between the housing 4 and the internal volume 2.

The bearing 30 is here formed by the two rolling elements 32 and 34, which are disposed on either side of the second sealing element 6. The rolling element 34 is thus disposed in the housing 4, while the rolling element 32 is disposed in the internal volume 2.

In the embodiment represented in FIG. 1, the secondary cavity 7 is formed in the first assembly 10, here more specifically in a segment of a crankcase of the hydraulic machine 1 which forms part of the first assembly 10, and which is at least partially around the rolling element 34. The considered component can be substantially modified so as to increase its radial space requirement to allow forming a secondary cavity 7 having a sufficient volume. The secondary cavity 7 is typically integrally cast.

More specifically, the rolling element 34 is bearing against a shoulder 13 of the first assembly 10 on the one hand, and against a shoulder 23 of the second assembly 20 on the other hand. A volume of the first assembly 10 is recessed so as to form the secondary cavity 7. This volume extends in particular radially around the rolling element 34.

The secondary cavity 7 typically extends over an angular sector of 360° about the axis of rotation X-X. As a variant, the secondary cavity 7 may only extend over a limited angular sector about the axis of rotation X-X, for example over an angular sector less than or equal to 180°.

As seen in the figure, the secondary cavity 7 as represented extends at least partially around at least one of the rolling elements, here the rolling element 34, relative to the axis of rotation X-X. Such a configuration is advantageous in terms of compactness, because it does not require extending the assembly along the direction of the axis of rotation X-X.

The secondary cavity 7 is connected to the housing 4 via a plurality of separate bores 71 formed in the first assembly 10, or in a continuous rib extending over the entire periphery of one face of the internal volume 4. The bores 71 as represented are formed so as to extend partly around an outer face of an outer ring of the rolling element 34, without affecting its holding by the shoulder 13.

The secondary cavity 7 is provided with a secondary orifice 72 opening out onto the surrounding environment, this secondary orifice 72 being obturated by a plug 8.

Figure 2:
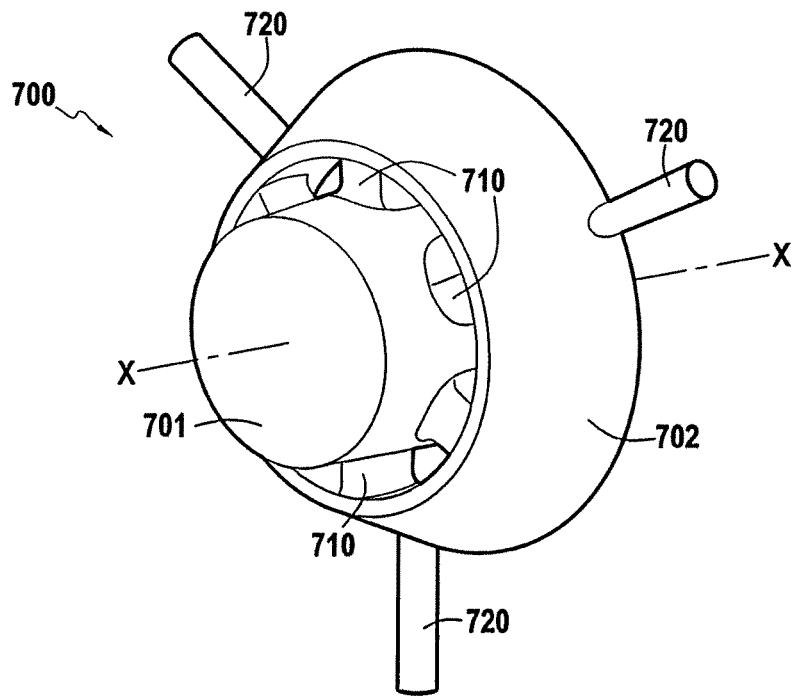
FIG. 2 is a perspective view of one example of a casting core that can be used to form the hydraulic machine as presented in FIG. 1.

FIG. 2 shows a perspective view of a casting core for the formation of the secondary cavity 7 in a portion of the hydraulic machine crankcase as represented in FIG. 1; this casting core 700 thus making it possible to visualize an example of geometry for the secondary cavity 7.

The casting core 700 as represented comprises a central segment 701 and a peripheral segment 702. The central segment 701 defines a central cavity of a crankcase portion, while the peripheral segment defines the shape of the secondary cavity 7. As the central segment 701 is here connected to the peripheral segment 702 via a plurality of radial ducts 710, these radial ducts 710 here defining the separate bores 71 mentioned above, connecting the secondary cavity 7 to the housing 4.

It is understood that the number and distribution of the radial ducts 710, and therefore the bores 71 may vary. In the example illustrated, the bores 71 are evenly distributed about the axis of rotation X-X, over the entire internal periphery of a component of the first assembly 10 such as a crankcase portion. As a variant, the bores 71 may only extend over a limited angular sector around the axis of rotation X-X, for example such that an angular sector corresponding to an area of the first assembly 10 subjected to higher mechanical stresses does not have bores 71. By way of example, the bores 71 extend only over an angular sector less than or equal to 180° about the axis of rotation X-X, for example an angular sector opposite to an anchor point of the hydraulic machine 1 or to an attachment point for pieces of equipment or elements driven by the hydraulic machine 1, for example an anchor point for tracks driven by the hydraulic machine 1.

The core 700 as represented in FIG. 2 comprises conduits 720 extending radially around the peripheral segment 702. These conduits 720 allow in particular forming one or several secondary orifices 72 as mentioned above.

The secondary orifices 72 allow in particular forming filling and/or emptying orifices for the oil present in the secondary cavity 7 and in the housing 4, and therefore ensure simplified access for these operations, without requiring a dismounting of the hydraulic machine 1.

The secondary cavity 7 is typically dimensioned such that the cumulative volume of the housing 4 and of the secondary cavity 7 allows receiving 150 mL or more of oil, while maintaining an air volume consistent with the recommendations for the considered sealing elements, for example at least 30% or at least 50% of the volume filled with air, and for example less than 75% of the volume filled with air. The cumulative volume of the housing 4 and of the secondary cavity 7 is thus typically greater than 200 mL, 220 mL or 300 mL.

The secondary cavity 7 may have radial ribs, in particular to enhance the mechanical properties of the component in which the secondary cavity 7 is formed. The secondary cavity 7 can thus be segmented into several separate cavities, these different cavities being connected to the housing 4 via the bores 71.

The hydraulic machine structure thus proposed, comprising a secondary cavity 7 as defined above, allows addressing the issues mentioned above, namely ensuring sufficient lubrication of the first sealing element 40 present in the housing 4 while avoiding increasing the space requirement of the hydraulic machine along the axial direction. The embodiment represented comprising the secondary orifices 72 also allows simplifying the operations of emptying and adding oil in the secondary cavity 7 and in the housing 4, without requiring a dismounting of the hydraulic machine 1.

Figure 3:
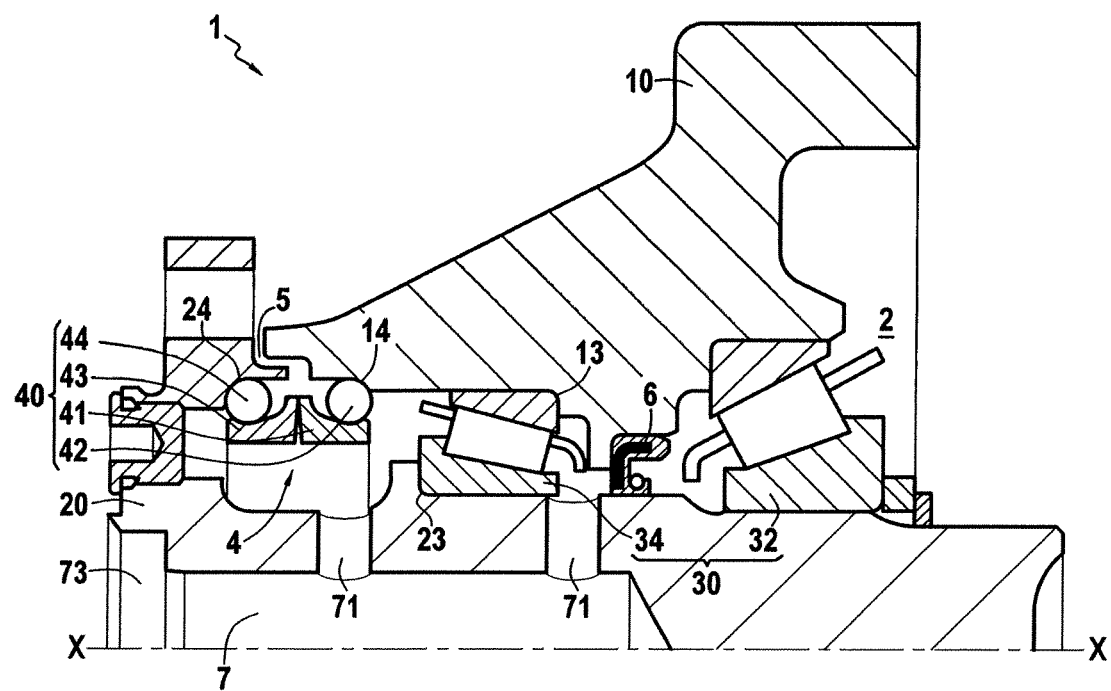
FIG. 3 is a partial cross-sectional view of another example of a hydraulic machine according to one aspect of the disclosure.

FIG. 3 shows another exemplary embodiment of a hydraulic machine 1 according to one aspect of the present disclosure.

In this embodiment, the secondary cavity 7 is formed in a component of the second assembly 20, namely a hydraulic machine shaft in the example illustrated.

In this embodiment, the secondary cavity 7 is formed by a bore made in a shaft which is here a component of the second assembly 20, said bore being blind, and opening out at a free end of the hydraulic machine 1. The through end 73 of the secondary cavity 7 can be obturated by a plug that must be placed at the housing 73 such as a closing plate, or by any other suitable means, not represented in FIG. 3.

The secondary cavity 7 is connected to the housing 4 via radial bores 71 made in the shaft. In the example illustrated, the secondary cavity 7 has bores 71 formed on either side of the rolling element 34. One or several separate bores 71 can thus be made in the shaft of the hydraulic machine 1. It is understood that this embodiment is not limiting, and that the secondary cavity 7 formed in the shaft can be connected to the housing 4 via any number of bores 71, which may or may not extend radially.

The functionalities of the secondary cavity 7 are similar to the functionalities already described above with reference to FIGS. 1 and 2, namely ensuring sufficient lubrication of the elements disposed in the housing 4, without increasing the axial space requirement of the hydraulic machine 1.

According to one example, the volume of the secondary cavity 7 is greater than or equal to the volume of the housing 4.

The embodiment represented in FIG. 3 can in particular be used in hydraulic machines whose shaft is not subjected to high loads.

The different embodiments presented thus allow addressing the issues of lubrication of the elements ensuring the sealing of the hydraulic machine relative to the surrounding environment, without requiring an increase in the radial space requirement.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

It is also obvious that all the characteristics described with reference to one method are transposable, alone or in combination, to one device, and conversely, all the characteristics described with reference to one device are transposable, alone or in combination, to one method.

The invention claimed is:

1. A hydraulic machine comprising a first assembly comprising a crankcase and a cam, and a second assembly comprising a shaft and a cylinder block, the first and second assembly being movable in rotation relative to each other about an axis of rotation, the first assembly and the second assembly defining an internal volume and being in contact along an interface, the interface between the first assembly and the second assembly being provided with a sealing element positioned in a housing connected to the internal volume via a first duct, and to the surrounding environment via a second duct, the first duct being provided with a sealing element adapted to isolate the housing from the internal volume, wherein said sealing element is an axial sealing element comprising a first metal annulus and a second metal annulus, a first elastomeric annulus and a second elastomeric annulus, wherein the first metal annulus and the second metal annulus are bearing against each other along the axial direction defined by the axis of rotation, the first elastomeric annulus is mounted bearing against the first metal annulus on the one hand, and against a partition wall of the first assembly on the other hand, the second elastomeric annulus is mounted bearing against the second metal annulus on the one hand, and against a partition wall of the second assembly on the other hand, a secondary cavity is formed in a portion of the crankcase of the hydraulic machine, said secondary cavity being isolated from the internal volume and connected to the housing via a plurality of bores formed in the first assembly, wherein said bores extend over an angular sector less than or equal to 180° about the axis of rotation, wherein the secondary cavity is dimensioned such that its volume is greater than or equal to the volume of the housing.

2. The hydraulic machine according to claim 1, comprising at least one bearing positioned in the housing, bearing against a first shoulder formed in the first assembly on the one hand and a second shoulder formed in the second assembly on the other hand, the secondary cavity opening out into the housing around said bearing relative to the axis of rotation.

3. The hydraulic machine according to claim 1, wherein the secondary cavity extends according to an angular sector of 360° about the axis of rotation.

4. The hydraulic machine according to claim 1, wherein the housing is formed so as to extend at least partially around a rolling element interposed between the first assembly and the second assembly, relative to the axis of rotation.

5. The hydraulic machine according to claim 1, wherein the secondary cavity is connected to the surrounding environment via a secondary orifice, said secondary orifice being provided with a plug.

6. A hydraulic machine comprising a first assembly comprising a crankcase and a cam, and a second assembly comprising a shaft and a cylinder block, the first and second assembly being movable in rotation relative to each other about an axis of rotation, the first assembly and the second assembly defining an internal volume and being in contact along an interface, the interface between the first assembly and the second assembly being provided with a sealing element positioned in a housing connected to the internal volume via a first duct, and to the surrounding environment via a second duct, the first duct being provided with a sealing element adapted to isolate the housing from the internal volume, wherein said sealing element is an axial sealing element comprising a first metal annulus and a second metal annulus, a first elastomeric annulus and a second elastomeric annulus, wherein the first metal annulus and the second metal annulus are bearing against each other along the axial direction defined by the axis of rotation, the first elastomeric annulus is mounted bearing against the first metal annulus on the one hand, and against a partition wall of the first assembly on the other hand, the second elastomeric annulus is mounted bearing against the second metal annulus on the one hand, and against a partition wall of the second assembly on the other hand, a secondary cavity is formed in the shaft of the hydraulic machine, said secondary cavity being isolated from the internal volume and connected to the housing and being connected to the housing via a plurality of separate bores formed in the shaft, wherein the secondary cavity is dimensioned such that its volume is greater than or equal to the volume of the housing.

7. The hydraulic machine according to claim 6, wherein the secondary cavity is connected to the surrounding environment via a secondary orifice, said secondary orifice being provided with a plug.

\* \* \* \* \*